United States Patent [19]

Cann et al.

[11] Patent Number: 5,442,018

[45] Date of Patent: Aug. 15, 1995

[54] ETHYLENE POLYMERIZATION USING A TITANIUM AND VANADIUM CATALYST SYSTEM IN STAGED REACTORS

[75] Inventors: Kevin J. Cann, Rocky Hill; James W. Nicoletti, Piscataway; Frederick J. Karol, Belle Mead, all of N.J.; Arthur E. Marcinkowsky, Charleston, W. Va.; Thomas E. Spriggs, Cross Lanes, W. Va.; Mark C. Hwu, South Charleston, W. Va.

[73] Assignee: Union Carbide Chemicals & Plastics Technology Corporation, Danbury, Conn.

[21] Appl. No.: 221,845

[22] Filed: Apr. 1, 1994

[51] Int. Cl.⁶ .............................................. C08F 2/34
[52] U.S. Cl. .................................... 526/65; 526/66; 526/78; 526/116; 525/53
[58] Field of Search ............ 526/116, 65, 66, 78; 525/53

[56] References Cited

U.S. PATENT DOCUMENTS

| 3,899,477 | 8/1975 | Altemore et al. | 260/94.9 B |
|---|---|---|---|
| 4,154,701 | 5/1979 | Melquist | 252/429 B |
| 4,303,771 | 12/1981 | Wagner et al. | 526/125 |
| 4,368,291 | 1/1983 | Frese et al. | 525/53 |
| 4,918,038 | 4/1990 | Samuels et al. | 525/53 |
| 5,047,468 | 9/1991 | Lee et al. | 525/53 |
| 5,126,398 | 6/1992 | Lee et al. | 525/53 |
| 5,149,738 | 9/1992 | Lee et al. | 525/53 |
| 5,177,042 | 1/1993 | Cann et al. | 502/119 |

FOREIGN PATENT DOCUMENTS

| 0131420 | 1/1985 | European Pat. Off. |
| 3324136 | 1/1985 | Germany |

Primary Examiner—Joseph L. Schofer
Assistant Examiner—Tom Weber
Attorney, Agent, or Firm—S. H. Hegedus; S. R. Bresch

[57] ABSTRACT

A process for producing polyethylene having a broad molecular weight distribution is provided, in which ethylene and optionally a comonomer are contacted in two reactors connected in series, one reactor containing a titanium-based catalyst and the other reactor containing a vanadium-based catalyst and a halohydrocarbon promoter, or alternatively, both reactors containing a mixed metal catalyst comprising both titanium and vanadium. In the latter case, the halohydrocarbon promoter is present in only one of the reactors to activate the vanadium sites of the catalyst and deactivate the titanium sites of the catalyst simultaneously.

19 Claims, No Drawings

ETHYLENE POLYMERIZATION USING A TITANIUM AND VANADIUM CATALYST SYSTEM IN STAGED REACTORS

The invention relates to the production of polyolefins having broad molecular weight distributions using a titanium and vanadium catalyst system in staged reactors.

BACKGROUND OF THE INVENTION

Polyolefins, particularly polyethylene, may be made with a broad range of properties. Especially preferred are high density polyethylene ("HDPE") and linear low density polyethylene ("LLDPE") made at low reaction pressures, typically 100 to 300 psi, and reaction temperatures of less than 100° C. HDPE and LLDPE can be used in many applications, such as films, injection molding, extrusion coating, rotational coating, blow molding, pipe, tubing, and wire and cable coatings. The properties of articles made from polyethylene often depend on the properties of the polyethylene, such as its molecular weight distribution, comonomer content, and so forth. These properties are in turn influenced by both the reaction conditions and the type of catalyst used to make the polyethylene.

Catalysts based on a variety of transition metals, such as titanium, vanadium, chromium and zirconium are known to be useful for producing polyethylene, and each type of catalyst produces polyethylene having different properties. For example, titanium-based catalysts tend to produce polyethylene with a narrower molecular weight distribution, lower chain termination response to hydrogen and lower comonomer incorporation efficiency, while vanadium-based catalysts tend to produce polyethylene with a broader molecular weight distribution, higher hydrogen chain termination response and a higher level of comonomer incorporation. Moreover, because titanium-based and vanadium-based catalysts each require unique reaction conditions to optimize their productivities, conducting polymerization with either a titanium-based or a vanadium-based catalyst in a single reactor normally dictates that reaction conditions be set within a relatively narrow range. The properties of the polyethylene produced using a single metal catalyst in a single reactor are therefore usually not subject to great variation.

One technique used to expand the operability range of processes for producing broad molecular weight polyethylene is to use a single metal catalyst in two or more staged reactors connected in series. For example, U.S. Pat. Nos. 5,047,468; 5,126,398; and 5,149,738 each relate to the preparation of polyethylene using a titanium-based catalyst in at least two fluidized bed reactors connected in series. Each reactor is operated at certain polymerization conditions such that ethylene copolymer having a high melt index is formed in one reactor and ethylene copolymer having a low melt index is formed in another reactor. The contents of one reactor are transferred to the immediately succeeding reactor, so that the final product is an intimate blend of the high and low melt index copolymers. Although each reactor may be operated under somewhat different reaction conditions, the conditions in each reactor are still limited by the operability range of the titanium-based catalyst.

Mixed metal catalysts in a single reactor have also been used to produce polyolefins having a broader range of properties. For example, U.S. Pat. No. 4,154,701 and DE 3 324 136 A1 relate to olefin polymerization using titanium/vanadium/zirconium catalysts. U.S. Pat. No. 3,899,477 and EP 0 131 420 A2 relate to olefin polymerization using titanium/vanadium catalysts and organoaluminum cocatalysts. This technique, however, is limited insofar as each metal in the catalyst must be active simultaneously in one reactor. This severely limits the operating range of the process, and therefore the range of polyethylene products that can be produced.

U.S. Pat. No. 4,918,038 describes a process for the production of ethylene homopolymers and copolymers having broad and/or bimodal molecular weight distributions using a catalyst system comprising vanadium-containing compounds and a zirconium-containing complex. Although the patent states that this process may be conducted in a single reactor or in a series of reactors, a single reactor is preferred due to efficiency and cost.

It has been discovered that the use of two staged reactors, one containing a titanium-based catalyst and the other containing a vanadium-based catalyst, or preferably both reactors containing a mixed metal titanium/vanadium catalyst, advantageously produces polyethylene having a broad molecular weight distribution. Polyethylene produced by this process is a mixture of titanium-derived polyethylene and vanadium-derived polyethylene. In particular, such polyethylene advantageously has a broad molecular weight distribution that is a combination of the molecular weight distributions of titanium-derived polyethylene and vanadium-derived polyethylene.

According to the invention, a halohydrocarbon promoter is present in one but not both of the reactors, where it activates vanadium catalytic sites and poisons titanium catalytic sites. In the reactor in which the halohydrocarbon promoter is not present, vanadium catalytic sites are inactive and titanium catalytic sites are active.

Specifically, in the case of one reactor containing a titanium-based catalyst and the other reactor containing a vanadium-based catalyst, the halohydrocarbon promoter is present in the reactor in which the vanadium-based catalyst is present. The halohydrocarbon promoter is substantially absent from the reactor containing the titanium-based catalyst.

In the case of both reactors containing a mixed metal titanium/vanadium catalyst, the halohydrocarbon promoter is present in the reactor in which it is desired to activate only the vanadium catalytic sites. The halohydrocarbon promoter is substantially absent from the reactor in which it is desired to activate the titanium catalytic sites.

SUMMARY OF THE INVENTION

The invention provides a process for preparing polyethylene, comprising 1) contacting in a first reactor under polymerization conditions ethylene and optionally a higher alpha-olefin monomer in the presence of:
 a titanium-based catalyst comprising:
  a titanium complex that is the reaction product of a titanium-containing compound in which the titanium is in the +3 or +4 oxidation state, a magnesium halide and a first electron donor; and
  optionally, a first modifier compound having the formula $AlX_aR_{(3-a)}$, wherein X is a halide, each R is independently an alkyl having 1 to about 14 carbon atoms, and a is 0, 1, 2, or 3; and a first cocatalyst having the formula AlR$_3$ to form a mixture; 2) transferring the mixture to a second reactor connected in series to the first reactor; and 3) contacting the mixture with further ethylene and optionally further comonomer in the second reactor under polymerization conditions in the presence of:

a vanadium-based catalyst comprising:
 a vanadium complex that is a vanadium-containing compound in which the vanadium is in the +2, +3, +4, or +5 oxidation state optionally reacted with a second electron donor; and
 optionally, a second modifier compound having the formula AlX$_a$R$_{(3-a)}$; and
a second cocatalyst having the formula AlR$_3$; and a halohydrocarbon promoter.

The invention also relates to a process for preparing polyethylene, comprising 1) contacting in a first reactor under polymerization conditions ethylene and optionally a comonomer in the presence of:

a vanadium-based catalyst comprising:
 a vanadium complex that is a vanadium-containing compound in which the vanadium is in the +2, +3, +4, or +5 oxidation state optionally reacted with a first electron donor; and
 optionally, a first modifier compound having the formula AlX$_a$R$_{(3-a)}$, wherein X is a halide, each R is independently an alkyl having 1 to about 14 carbon atoms, and a is 0, 1, 2, or 3; and
a first cocatalyst hating the formula AlR$_3$; and a halohydrocarbon promoter to form a mixture; 2) removing substantially all of the halohydrocarbon promoter from the mixture; 3) transferring the mixture to a second reactor connected in series to the first reactor; and 4) contacting the mixture with further ethylene and optionally further comonomer in the second reactor under polymerization conditions in the presence of:

a titanium-based catalyst comprising:
 a titanium complex that is the reaction product of a titanium-containing compound in which the titanium is in the +3 or +4 oxidation state, a magnesium halide and a second electron donor; and
 optionally, a second modifier compound having the formula AlX$_a$R$_{(3-a)}$; and
a second cocatalyst having the formula AlR$_3$.

In a preferred embodiment, the invention provides a process for preparing polyethylene, comprising: 1) contacting in a first reactor under polymerization conditions ethylene and optionally a comonomer in the presence of.

a mixed metal catalyst comprising:
 a titanium complex that is the reaction product of a titanium-containing compound in which the titanium is in the +3 or +4 oxidation state, a magnesium halide and a first electron donor;
 a vanadium complex that is a vanadium-containing compound in which the vanadium is in the +2, +3, +4 or +5 oxidation state optionally reacted with a second electron donor; and
 optionally, a modifier compound having the formula AlX$_a$R$_{(3-a)}$, wherein X is a halide, each R is independently an alkyl having 1 to about 14 carbon atoms, and a is 0, 1, 2, or 3; and
a first cocatalyst having the formula AlR$_3$; to form a mixture; 2) transferring the mixture to a second reactor connected in series to the first reactor; and 3) contacting the mixture with further ethylene, optionally further comonomer, and a second cocatalyst having the formula AlR$_3$ in the second reactor under polymerization conditions; wherein a halohydrocarbon promoter is present in one but not both of the reactors.

The invention also relates to polyethylene made by these processes, specifically polyethylene having a polydispersity index (PDI) in the range of about 10 to about 30 and a melt flow ratio (MFR) in the range of about 100 to about 300.

DETAILED DESCRIPTION OF THE INVENTION

The present invention may be used to prepare ethylene polymers including homopolymers, and copolymers and terpolymers made by copolymerizing ethylene monomer with one or more comonomers such as higher alpha-olefin monomers containing 3 to about 12, preferably 3 to about 8, carbon atoms or dienes. Suitable higher alpha-olefin monomers include for example propylene, 1-butene, 1-hexene, 4-methyl-1-pentene, and 1-octene. A preferred higher alpha-olefin monomer is 1-hexene. Suitable dienes include for example ethylidene norbornene and hexadiene.

The processes of the invention are carried out in two reactors connected in series. Some polymerization to polyethylene takes place in the first reactor. After the desired reaction time in the first reactor the contents of the first reactor are transferred to the second reactor where further polymerization takes place. One reactor produces titanium-derived polyethylene with a PDI in the range of about 2.7 to about 5.0 and an MFR of about 22 to about 32, and the other reactor produces vanadium-derived polyethylene with a PDI in the range of about 7 to about 15 and an MFR in the range of about 50 to about 120. The final product is a blend of titanium-derived and vanadium-derived polyethylene, and therefore has the properties of both. The final polyethylene product has a PDI in the range of about 15 to about 30 and an MFR of about 100 to about 300. The processes may be used to prepare polyethylene having a wide range of densities, i.e., from about 0.860 to about 0.965 g/cc.

In one embodiment of the invention, one reactor contains a titanium-based catalyst while the other reactor contains a vanadium-based catalyst and a halohydrocarbon promoter. The titanium-based catalyst may be present in the first reactor in the series while the vanadium-based catalyst and the halohydrocarbon promoter are present in the second reactor in the series. In this case, titanium-derived polyethylene is produced in the first reactor and vanadium-derived polyethylene is produced in the second reactor. Alternatively, the vanadium-based catalyst and the halohydrocarbon promoter may be present in the first reactor in the series while the titanium-based catalyst is present in the second reactor in the series. In this case, vanadium-derived polyethylene is produced in the first reactor and titanium-derived polyethylene is produced in the second reactor.

When separate titanium-based and vanadium-based catalysts are used, it is preferred that the vanadium-based catalyst and halohydrocarbon promoter be present in the second reactor in the series. If the vanadium-based catalyst and the halohydrocarbon promoter are instead present in the first reactor in the series, the additional step of removing substantially all of the halohydrocarbon promoter before the contents of the first reactor are transferred to the second reactor is required, since the halohydrocarbon promoter is a poison for the titanium-based catalyst. Removal of the halohydrocarbon promoter from the mixture may be accomplished by, for example, purging the contents of the first reactor with an inert gas such as nitrogen before transfer to the second reactor.

In a preferred embodiment of the invention, a single, mixed metal catalyst containing both titanium and vanadium is used in both reactors. More preferably, a mixed metal catalyst comprising a titanium complex and a vanadium complex coimpregnated in support material is used in both reactors. Use of a mixed metal catalyst containing both titanium and vanadium results in a highly intimate blend of titanium-derived polyethylene and vanadium-derived polyethylene in the final product. When the titanium complex and vanadium complex are coimpregnated in the same support material, such blending advantageously occurs on a molecular level. Again, the halohydrocarbon promoter is present in only one of the reactors, either the first or the second reactor as desired, to activate the vanadium sites and deactivate the titanium sites of the mixed metal catalyst. Depending on whether the halohydrocarbon promoter is present in the first reactor or the second reactor in the series, either primarily titanium-derived polyethylene or primarily vanadium-derived polyethylene will be produced in the first reactor. If the halohydrocarbon promoter is present in the first reactor in the series, it must be removed from the material exiting the first reactor before the material enters the second reactor. Otherwise the halohydrocarbon promoter will activate the vanadium sites of the catalyst and deactivate the titanium sites of the catalyst in both the first and second reactors.

Because the titanium-derived polyethylene and the vanadium-derived polyethylene are generated in separate reactors, it is advantageously possible to vary such properties as the molecular weight and density of the titanium-derived and vanadium-derived polyethylene independently. For example, the titanium-derived polyethylene may be made having a low average molecular weight and a high density while the vanadium-derived polyethylene is made with a high average molecular weight and a low density. Alternatively, the titanium-derived polyethylene may be made with a high average molecular weight and a low density, while the vanadium-derived polyethylene is made with a low average molecular weight and a high density. This degree of independent control over polymer properties such as molecular weight, density and molecular weight distribution is not possible with single metal catalysts in staged reactors or mixed metal catalysts in single reactors.

In the case of the titanium-based catalyst in the first reactor and the vanadium-based catalyst in the second reactor, polyethylene is prepared by: 1) contacting ethylene and optionally one or more comonomers in the first reactor under polymerization conditions in the presence of a titanium-based catalyst and a first cocatalyst to form a mixture of ethylene, comonomer (if present), titanium-based catalyst, first cocatalyst and titanium-derived polyethylene; 2) transferring the mixture to the second reactor connected in series to the first reactor; and 3) contacting the mixture with further ethylene and optionally further comonomer in the second reactor under polymerization conditions in the presence of a vanadium-based catalyst, a second cocatalyst and a halohydrocarbon promoter.

In the case of the vanadium-based catalyst in the first reactor and the titanium-based catalyst in the second reactor, polyethylene is prepared by: 1) contacting ethylene and optionally one or more comonomers in the first reactor under polymerization conditions in the presence of a vanadium-based catalyst, a first cocatalyst and a halohydrocarbon promoter to form a mixture of ethylene, comonomer (if present), vanadium-based catalyst, first cocatalyst, halohydrocarbon promoter and vanadium-derived polyethylene; 2) removing substantially all of the halohydrocarbon promoter from the mixture; 3) transferring the mixture to the second reactor connected in series to the first reactor; and 4) contacting the mixture with further ethylene and optionally further comonomer in the second reactor under polymerization conditions in the presence of a titanium-based catalyst and a second cocatalyst.

In the preferred case of both reactors containing a titanium/vanadium mixed metal catalyst, polyethylene is prepared by 1) contacting ethylene and optionally one or more comonomers in the first reactor under polymerization conditions in the presence of the mixed metal catalyst and a first cocatalyst to form a mixture; 2) transferring the mixture to a second reactor connected in series to the first reactor; and 3) contacting the mixture with further ethylene, optionally further comonomer, and a second cocatalyst in the second reactor under polymerization conditions; wherein the halohydrocarbon promoter is present in one but not both of the reactors. If the halohydrocarbon promoter is present in the first reactor, the mixture formed therein will also contain ethylene, comonomer (if used), mixed metal catalyst, first cocatalyst and vanadium-derived polyethylene. If instead the halohydrocarbon promoter is present in the second reactor, the mixture in the first reactor will contain ethylene, comonomer (if used), mixed metal catalyst, first cocatalyst, and titanium-derived polyethylene.

Whether using separate titanium-based and vanadium-based catalysts or a single mixed metal catalyst, contacting may be carried out in the gas phase or in the liquid slurry phase and may be in the continuous or batch mode. When contacting is performed in the gas phase, the reactors may, for example, be fluidized bed reactors or stirred bed reactors.

Preferably, both reactors are fluidized bed reactors and contacting in each reactor takes place continuously in the gas phase. A suitable fluidized bed reactor is described in U.S. Pat. No. 4,482,687. The essential parts of such a fluidized bed reactor system are a reactor vessel, a bed within the vessel, a gas distribution plate also within the vessel, inlet and outlet piping, a compressor, cycle gas cooler, and a product discharge system. In the vessel above the bed there is a velocity reduction zone, and in the bed a reaction zone. Both are above the gas distribution plate.

During polymerization the bed comprises formed polymer particles, growing polymer particles, and particles of catalyst and cocatalyst fluidized by a continuous flow of fluidizing gas introduced at a flow rate or velocity sufficient to cause the particles to separate and act as a fluid. The fluidizing gas is made up of the initial feed of ethylene and optionally comonomer, make-up feed, and cycle (recycle) gas.

If desired, additives such as chain transfer agents, inert carrier gas and the like may be admixed with the ethylene and comonomer. A particularly useful chain transfer agent is hydrogen gas, which may be used in the process in an amount up to about 3.0 moles of hydrogen per mole of monomer (ethylene and comonomer, if any) in the gas stream.

The titanium-based catalyst comprises at least one titanium complex and, optionally, at least one first modifier compound. Similarly, the vanadium-based catalyst comprises at least one vanadium complex and, optionally, at least one modifier compound. The mixed metal catalyst comprises at least one titanium complex, at least one vanadium complex, and, optionally, at least one modifier compound.

The titanium complex is the reaction product of a titanium-containing compound in which the titanium is in the +3 or +4 oxidation state, a magnesium halide and an electron donor. One or more than one titanium-containing compound may be used in the titanium complex. Suitable titanium-containing compounds include, for example, $TiCl_3$, $TiCl_4$, $Ti(OCH_3)Cl_3$, $Ti(OC_6H_5)Cl_3$, $Ti(OCOCH_3)Cl_3$, $Ti(OCOC_6H_5)Cl_3$, and mixtures thereof. Preferably, the titanium-containing compound has the formula $TiX_3$ or $TiX_4$, wherein X is a halide, such as chlorine, bromine, or iodine. Most preferably, the titanium-containing compound is $TiCl_3$ or $TiCl_{14}$.

Preferably, the magnesium halide has the formula $MgX_2$, wherein X is a halide such as chlorine, bromine, or iodine. More preferably, the magnesium halide is $MgCl_2$. One or more than one magnesium halide may be used.

Preferably, the mole ratio of magnesium to titanium in the titanium complex is from about 0.5:1 to about 56:1, more preferably from about 2:1 to about 5:1. The mole ratio of titanium to electron donor in the titanium complex is preferably from about 1:100 to about 1:2, more preferably from about 1:10 to about 1:4.

The vanadium complex is either 1) a vanadium-containing compound in which the vanadium is in the +2, +3, +4, or +5 oxidation state, preferably the +2 or +3 oxidation state, or 2) a vanadium-containing compound in which the vanadium is in the +2, +3, +4, or +5 oxidation state, preferably the +2 or +3 oxidation state, reacted with an electron donor. One or more than one vanadium-containing compound may be used in the vanadium complex. Preferably, the vanadium-containing compound has the formula $VX_3$, wherein X is a halide, such as chlorine, bromine, or iodine. More preferably, the vanadium-containing compound is $VCl_3$.

When an electron donor is used to make the vanadium complex, the mole ratio of vanadium to electron donor in the vanadium complex is preferably from about 1:1 to about 1:20, more preferably from about 1:1 to about 1:10. Most preferably, the mole ratio of vanadium to electron donor in the vanadium complex is about 1:3.

Electron donors for both the titanium complex and the vanadium complex are organic Lewis bases and are liquids at temperatures in the range of about 0° C. to about 200° C. The titanium-containing compound and the magnesium halide are soluble in the electron donor used to make the titanium complex. If an electron donor is used to make the vanadium complex, the vanadium-containing compound is soluble in that electron donor. One or more than one electron donor may be used in preparing both the titanium complex and the vanadium complex. Suitable electron donors include, for example, alkyl esters of aliphatic or aromatic carboxylic acids, aliphatic ketones, aliphatic amines, aliphatic alcohols and alkyl or cycloalkyl ethers. Preferred electron donors are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Examples of suitable electron donors are tetrahydrofuran, methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate. Tetrahydrofuran is the preferred electron donor.

The titanium-based catalyst, the vanadium-based catalyst and the mixed metal catalyst may each optionally contain one or more modifier compounds having the formula $AlX_aR_{(3-a)}$, wherein X is a halide such as chlorine, bromine, or iodine, each R is independently an alkyl having 1 to about 14 carbon atoms, and a is 0, 1, 2, or 3. Examples of useful modifier compounds include triisobutylaluminum, trihexylaluminum, diisobutylaluminum hydride, dihexylaluminum hydride, diisobutylhexylaluminum, trimethylaluminum, triethylaluminum, diethylaluminum chloride, $Al_2(C_2H_5)_3Cl_3$ and $Al(C_2H_5)_2(OC_2H_5)$. Preferred modifier compounds are triethylaluminum, triisobutylaluminum and diethylaluminum chloride. The most preferred modifier compounds are diethylaluminum chloride and trihexylaluminum.

Up to about 10 moles, preferably about 1 to about 5 moles, of modifier compound may be used per mole of transition metal (titanium and/or vanadium).

The titanium-based catalyst, vanadium-based catalyst and the mixed metal catalyst may each be unsupported or supported. Support material such as silica, alumina, or any other inert substance conventionally used for supporting catalysts are suitable for supporting the catalysts. Silica is preferred. Typically, the support material is solid, particulate, porous and essentially inert to the polymerization. It is used as a dry powder having an average particle size of about 10 to about 250 microns and preferably about 30 to about 100 microns; a surface area of at least about 3 square meters per gram and preferably at least about 50 square meters per gram; and a pore size of at least about 80 angstroms and preferably at least about 100 angstroms. Generally, if used, the amount of support material is that which will provide about 0.1 to about 1.0 millimole of transition metal per gram of support material and preferably about 0.25 to about 0.5 millimole of transition metal per gram of support material.

A supported titanium-based catalyst may be made, for example, by mixing the titanium complex with silica gel in an electron donor or other solvent, and then removing the electron donor or solvent under reduced pressure. Similarly, a supported vanadium-based catalyst may be prepared by mixing the vanadium complex with silica gel in an electron donor solvent or other solvent, followed by removal of the electron donor or solvent.

A supported mixed metal catalyst may be prepared, for example, by simply mixing the above-described supported titanium-based catalyst and supported vanadium-based catalyst after they have been dried.

A particularly preferred embodiment of the invention utilizes a mixed metal catalyst comprising titanium complex and vandium complex coimpregnated in a support material. Such a catalyst may be made by mixing the titanium complex in a first electron donor and the vanadium complex optionally in a second electron donor with silica gel, and then removing the first and second electron donors to form the coimpregnated catalyst. Coimpregnation is the preferred method of making the mixed metal catalyst, since it results in a more intimate mixture of titanium and vanadium sites in the catalyst, which produces a more intimate blend (i.e., on a micro scale) of titanium-derived polyethylene and vanadium-derived polyethylene in the final product.

Modifier compounds, if used, may be introduced either before or after the titanium and vanadium complexes have been impregnated into the support material. If introduced after impregnation into the support material, the modifier compounds may be dissolved in an organic solvent such as hexane or isopentane before they are added to the titanium and/or vanadium-containing support material.

Each catalyst is used in conjunction with one or more cocatalysts having the formula $AlR_3$, wherein R is as defined above, namely each R is independently an alkyl having 1 to about 14 carbon atoms. The same or different cocatalysts may be used in the first and second reactors. Examples of suitable cocatalysts include triisobutylaluminum, trihexylaluminum, diisobutylhexylaluminum, isobutyldihexylaluminum, trimethylaluminum, triethylaluminum, tripropylaluminum, triisopropylaluminum, tri-n-butylaluminum, trioctylaluminum, tridecylaluminum and tridodecylaluminum. Preferred cocatalysts are triethylaluminum, triisobutylaluminum and trihexylaluminum. The most preferred cocatalyst is triethylaluminum.

The mole ratio of titanium-based catalyst to cocatalyst may range from about 10 to about 200, preferably from about 15 to about 60. The mole ratio of vanadium-based catalyst to cocatalyst may range from about 10 to about 200, preferably from about 15 to about 60. The mole ratio of mixed metal catalyst to cocatalyst may range from about 10 to about 400, preferably from about 15 to about 60.

The halohydrocarbon promoter is selected such that it simultaneously activates vanadium catalytic sites and deactivates titanium catalytic sites.

Preferred halohydrocarbon promoters include fluoro-, chloro-, and bromo-substituted methane and ethane containing at least two halogen atoms, for example $CHCl_3$, $CCl_4$, $C_3HCl_7$, $CFCl_3$ and $CClF_2CCl_3$, and mixtures thereof. Especially preferred as halohydrocarbon promoters are $CHCl_3$, $CFCl_3$ and mixtures thereof. The halohydrocarbon promoter is generally present in the process in an amount ranging from about 0.1 to about 10, preferably from about 0.2 to about 2, moles of halohydrocarbon promoter per mole of total cocatalyst.

If desired, one or more ethers may be present in the processes with the halohydrocarbon promoter. Ethers such as linear and cyclic aliphatic ethers like methyl t-butyl ether, diethyl ether, diisopropyl ether, di-n-propyl ether, isopropylethyl ether, di-n-butyl ether, di-n-octyl ether, di-n-decyl ether, di-n-dodecyl ether and dicyclohexyl ether; cycloaliphatic ethers such as tetrahydrofuran, tetrahydropyran, trimethylene oxide, dioxan and trioxan; and aromatic ethers such as diphenyl ether and anisole, enhance the activity of vanadium-based catalysts, as described in U.S. Pat. No. 5,177,042. Accordingly, such ethers may be added to the present processes at the same time as the halohydrocarbon promoter to boost further the activity of the vanadium catalytic sites.

The following examples further illustrate the invention. Abbreviations used in the examples are defined as follows:

| Designation | Description |
| --- | --- |
| Freon | Fluorotrichloromethane ($CFCl_3$) |
| DEALE | Diethylaluminum Ethoxide ($Al(C_2H_5)_2(OC_2H_5)$) |
| TnHAL | Tri-n-hexylaluminum ($Al(n-C_6H_{13})_3$) |
| TEAL | Triethylaluminum ($Al(C_2H_5)_3$) |
| DEAC | Diethylaluminum Chloride ($AlCl(C_2H_5)_2$) |
| THF | Tetrahydrofuran ($C_4H_8O$) |
| MI | Melt Index (dg/min), measured using ASTM D-1238, Condition E |
| FI | Flow Index (dg/min), measured using ASTM D-1238, Condition F |
| MFR | Melt Flow Ratio - the ratio of the Flow Index divided by the Melt Index (FI/MI). |

EXAMPLES 1-15

Preparation of Titanium-Based Catalyst

Titanium-based catalyst ("T") was made by dissolving $MgCl_2$ and $TiCl_3$. $0.33AlCl_3$ in THF using a 3 Mg/Ti molar ratio. The mixture was refluxed until all the solids dissolved. A support was prepared by heating silica gel in nitrogen at 600°–800° C. to remove water and most surface silanol groups. The dehydrated silica was then treated with TEAL to make a support containing 5.5 wt % TEAL. The treated support was added to the THF solution and the slurry was dried to give a free-flowing powder containing Ti, Mg, Cl, Al, $SiO_2$, and THF. The resulting composition was analyzed for THF content and then slurried in a hydrocarbon solvent. TnHAL was added at a level of about 0.2 TnHAL/THF. Drying this slurry provided the titanium-based catalyst containing 1.11 wt % titanium (0.23 mmol Ti/g).

Preparation of Vanadium-Based Catalysts

Two vanadium-based catalysts ("V1" and "V2") were each made by dissolving $VCl_3$ in THF and adding silica gel that had been previously dehydrated at 600° C. Drying the slurry at about 55° C. gave a free-flowing powder containing V, Cl, $SiO_2$ and THF. This material was slurried in a hydrocarbon solvent and treated with DEAC at a level giving 1.2 mmol DEAC/g of final catalyst. Drying the mixture at about 45° C. under a purge of dry nitrogen produced a dry, free-flowing powder.

Catalyst V1 contained 1.14 wt % vanadium (0.22 mmol V/g) while catalyst V2 contained 2.30 wt % vanadium (0.45 mmol V/g).

Preparation of Blended Titanium/Vanadium Catalyst

A mixed metal titanium/vanadium catalyst was made by blending catalysts T and V2 ("Blend"). One part of the titanium catalyst T (with 1.11 wt % Ti) was dry mixed with 2 parts of the vanadium catalyst V2 (2.3 wt% V) in an inert atmosphere glove box. The resulting blended catalyst had a composition of 0.37 wt% titanium (0.077 mmol Ti/g) and 1.53 wt% vanadium (0.30 mmol V/g). The total transition metal loading was 0.38 mmol (Ti+V)/g.

Preparation of Coimpregnated Titanium/Vanadium Catalyst

A coimpregnated, mixed metal titanium/vanadium catalyst ("Coimpreg") was made as follows. To a THF solution containing 1.25 mmol $VCl_3$, 1.17 mmol $TiCl_3$ (1.1 V/Ti), and 3.51 mmol $MgCl_2$ (3 Mg/Ti) was added 6.4 mL of a 1.5M DEAC solution in hexane. The mixture was heated under nitrogen to 65° C. for 30 minutes during which time it turned from dark purple-blue to green. Dehydrated silica (7.0 g) was then added. The mixture was stirred briefly, then the solvent was removed under vacuum to give a free-flowing powder. The coimpregnated catalyst had a calculated loading of 0.25 mmol total transition metal (Ti+V) per gram.

Polymerization Procedure

Each of the above-described catalysts was used to polymerize ethylene (along with 1-hexene in all but Examples 4 and 7). Table 1 below describes the polymerization conditions for each Example.

In each Example, a one liter stirred batch reactor was charged under nitrogen with 500 mL of dry hexane followed by the catalyst. Following introduction of the catalyst, a one time batch charge of 20 mL of 1-hexene was added (if used) and the desired amount of hydrogen was added for molecular weight control. The reactor was then pressurized with ethylene to 160 psi at 85° C. Next, halohydrocarbon promoter was charged to the reactor (where used) and the reactor solution temperature was lowered 5° to 10° C. The cocatalyst was then added and the reactor solution temperature was again raised to the desired reaction temperature. At the end of a 30 minute reaction period, ethanol was injected into the reaction solution to quench the polymerization.

Catalyst activities were determined by mass balance and the polymer compositions were determined by NMR analysis. Polymerization results are set forth in Table 2 below.

The above data demonstrate that halohydrocarbon promoters such as $CFCl_3$ and $CHCl_3$ activate vanadium catalytic sites and deactivate titanium catalytic sites. In particular, the coimpregnated catalyst produced titanium-derived polyethylene having a lower MFR when the halohydrocarbon promoter was not present, and vanadium-derived polyethylene having a higher MFR when the halohydrocarbon promoter was present. Accordingly, a combination of titanium and vanadium catalytic sites, either in separate catalysts in or in a single mixed metal catalyst, may advantageously be used to make a blend of titanium-derived and vanadium-derived polyethylene in staged reactors by the simple use of a halohydrocarbon promoter to activate or deactivate the titanium or vanadium catalytic sites as desired in each reactor.

EXAMPLE 16

Polyethylene is produced according to the invention in two staged reactors using the coimpregnated catalyst (Coimpreg) described above in both reactors as follows.

The coimpregnated catalyst is fed to the first reactor with cocatalyst, ethylene and hydrogen to produce a high melt index, narrow molecular weight distribution, titanium-derived polyethylene product. The amount of cocatalyst used is from 150 to 1500 ppm based on the bed resin. The mole ratio of hydrogen to ethylene is from 0.5:1 to 2.0:1. The first reactor temperature is from 70° to 100° C.

TABLE 1

| | | | Polymerization Conditions | | | | | |
|---|---|---|---|---|---|---|---|---|
| Ex. No. | Catalyst | Catalyst Amount (g) | Promoter | Promoter Amount (mmol) | Cocatalyst | Cocatalyst Amount (mmol) | $H_2$ (psi) | $C_2$ (psi) | Hexene (mL) |
| 1 | T | 0.1062 | NONE | 0.00 | TEAL | 1.00 | 20 | 160 | 20 |
| 2 | T | 0.0779 | NONE | 0.00 | TIBA | 0.73 | 10 | 160 | 20 |
| 3 | T | 0.1034 | NONE | 0.00 | TEAL · THF | 0.97 | 10 | 160 | 20 |
| 4 | T | 0.1106 | CFCl3 | 1.00 | TEAL | 1.03 | 10 | 130 | 0 |
| 5 | T | 0.1379 | CHCl3 | 1.30 | TEAL | 1.29 | 20 | 160 | 20 |
| 6 | V1 | 0.182 | NONE | 0.00 | TIBA | 1.65 | 20 | 160 | 20 |
| 7 | V2 | 0.0744 | CHCl3 | 0.67 | TIBA | 0.66 | 1 | 160 | 0 |
| 8 | V2 | 0.0426 | CHCl3 | 0.12 | TEAL | 0.77 | 1 | 160 | 20 |
| 9 | V2 | 0.0428 | CHCl3 | 0.78 | TEAL · THF | 0.79 | 1 | 160 | 20 |
| 10 | V2 | 0.0425 | CFCl3 | 0.12 | TEAL | 0.77 | 1 | 160 | 20 |
| 11 | Blend | 0.0537 | CHCl3 | 0.83 | TEAL | 0.83 | 1 | 160 | 20 |
| 12 | Blend | 0.0802 | CFCl3 | 1.23 | TEAL · THF | 1.23 | 1 | 160 | 20 |
| 13 | Coimpreg | 0.1206 | NONE | 0.00 | TEAL | 1.2 | 1 | 160 | 20 |
| 14 | Coimpreg | 0.1236 | CHCl3 | 1.23 | TEAL | 1.23 | 1 | 160 | 20 |
| 15 | Coimpreg | 0.1253 | CFCl3 | 1.25 | TEAL | 1.25 | 1 | 160 | 20 |

TABLE 2

| | Polymerization Results | | | |
|---|---|---|---|---|
| Ex. No. | Yield* | Activity** | MI | FI | MFR |
| 1 | 52 | 3089 | 1.69 | 46.7 | 28 |
| 2 | 93 | 6578 | 0.38 | 13.8 | 36 |
| 3 | 35 | 2201 | 0.35 | 10.9 | 31 |
| 4 | 30 | 2020 | 0.38 | 11.8 | 31 |
| 5 | 17 | 772 | 0.35 | 11.3 | 32 |
| 6 | 18 | 619 | 1.41 | 95.9 | 68 |
| 7 | 38 | 2861 | 0.91 | 49.6 | 54 |
| 8 | 41 | 2631 | 0.54 | 45.4 | 84 |
| 9 | 81 | 5177 | 1.47 | 69.5 | 47 |
| 10 | 26 | 1673 | 0.78 | 62 | 79 |
| 11 | 64 | 3503 | 0.09 | 4.12 | 48 |
| 12 | 118 | 4922 | 0.75 | 43.5 | 58 |
| 13 | 93 | 3959 | 0.12 | 4.17 | 35 |
| 14 | 41 | 1704 | 0.08 | 4.29 | 56 |
| 15 | 44 | 1825 | 0.21 | 12.3 | 59 |

*Catalyst yield is expressed as grams of polyethylene produced.
**Catalyst activity is expressed as g PE/mmol(Ti + V) − hr − 100 psi.

The contents of the first reactor, including the titanium-derived polyethylene and the coimpregnated catalyst, are transferred to the second reactor where high molecular weight, low melt index, broad molecular weight distribution, vanadium-derived polyethylene is produced. Ethylene, 1-hexene and hydrogen are added to the second reactor. Chloroform ($CHCl_3$) is added to the second reactor at a chloroform/cocatalyst ratio of 1:1. The chloroform activates the vanadium catalytic sites and poisons the titanium catalytic sites. Additional cocatalyst may be added if needed to establish high catalyst activity. The mole ratio of hydrogen to ethylene is in the range of 0.006:1 to 0.007:1. The mole ratio of 1-hexene to ethylene is in the range of 0.011:1 to 0.12:1. The operating temperature in the second reactor is in the range of 70° to 100° C. The pressure in both reactors is from 280 to 320 psig.

EXAMPLE 17

Polyethylene is produced according to the invention in two staged reactors using the titanium-based catalyst (T) in the first reactor and the vanadium-based catalyst (V1) in the second reactor as follows.

The titanium-based catalyst is fed to the first reactor with a first cocatalyst, ethylene, 1-hexene and hydrogen to produce a high melt index, narrow molecular weight distribution, titanium-derived polyethylene product. The amount of first cocatalyst used is from 150 to 1500 ppm based on the bed resin. The mole ratio of hydrogen to ethylene is from 0.5:1 to 3:1. The mole ratio of 1-hexene to ethylene is in the range of 0.011:1 to 0.12:1. The first reactor temperature is from 70° to 100° C.

The contents of the first reactor, including the titanium-derived polyethylene and titanium-based catalyst, are transferred to the second reactor where high molecular weight, low melt index, broad molecular weight distribution, vanadium-derived polyethylene is produced. Ethylene and hydrogen are added to the second reactor. In addition, the vanadium-based catalyst, a second cocatalyst and chloroform is added to the second reactor. The chloroform/second cocatalyst ratio is 0.5:1 to 2.0:1. The chloroform activates the vanadium catalytic sites and poisons the titanium catalytic sites. The mole ratio of hydrogen to ethylene is in the range of 0.006:1 to 0.007:1. The operating temperature in the second reactor is in the range of 70° to 100° C. The pressure in both reactors is from 280 to 320 psig.

We claim:

1. A process for preparing polyethylene, comprising 1) contacting in a first reactor under polymerization conditions ethylene and optionally a comonomer in the presence of:
   a titanium-based catalyst containing:
      a titanium complex that is the reaction product of a titanium-containing compound in which the titanium is in the +3 or +4 oxidation state, a magnesium halide and a first electron donor; and
      optionally, a first modifier compound having the formula $AlX_aR_{(3-a)}$, wherein X is a halide, each R is independently an alkyl having 1 to about 14 carbon atoms, and a is 0, 1, 2, or 3; and
   a first cocatalyst having the formula $AlR_3$, to form a mixture; 2) transferring the mixture to a second reactor connected in series to the first reactor; and 3) contacting the mixture with further ethylene and optionally further comonomer in the second reactor under polymerization conditions in the presence of:
   a vanadium-based catalyst comprising:
      a vanadium complex that is a vanadium-containing compound in which the vanadium is in the +2, +3, +4, or +5 oxidation state optionally reacted with a second electron donor; and
      optionally, a second modifier compound having the formula $AlX_aR_{(3-a)}$; and
   a second cocatalyst having the formula $AlR_3$; and a halohydrocarbon promoter.

2. The process of claim 1, wherein the titanium-containing compound is $TiCl_3$ or $TiCl_4$, the vanadium-containing compound is $VCl_3$ and the magnesium halide is $MgCl_2$.

3. The process of claim 1, wherein the halohydrocarbon promoter is selected from $CHCl_3$, $CCl_4$, $C_3HCl_7$, $CFCl_3$, $CClF_2CC_3$ and mixtures thereof.

4. The process of claim 1, wherein the first reactor and the second reactor are each fluidized bed reactors and contacting in each reactor takes place continuously in the gas phase.

5. A process for preparing polyethylene, comprising 1) contacting in a first reactor under polymerization conditions ethylene and optionally a comonomer in the presence of:
   a vanadium-based catalyst comprising:
      a vanadium complex that is a vanadium-containing compound in which the vanadium is in the +2, +3, +4, or +5 oxidation state optionally reacted with a first electron donor; and
      optionally, a first modifier compound having the formula $AlX_aR_{(3-a)}$, wherein X is a halide, each R is independently an alkyl having 1 to about 14 carbon atoms, and a is 0, 1, 2, or 3; and
   a first cocatalyst having the formula $AlR_3$; and a halohydrocarbon promoter to form a mixture; 2) removing substantially all of the halohydrocarbon promoter from the mixture; 3) transferring the mixture to a second reactor connected in series to the first reactor; and 4) contacting the mixture with further ethylene and optionally further comonomer in the second reactor under polymerization conditions in the presence of:
   a titanium-based catalyst comprising:
      a titanium complex that is the reaction product of a titanium-containing compound in which the titanium is in the +3 or +4 oxidation state, a magnesium halide and a second electron donor; and
      optionally, a second modifier compound having the formula $AlX_aR_{(3-a)}$; and
   a second cocatalyst having the formula $AlR_3$.

6. The process of claim 5, wherein the titanium-containing compound is $TiCl_3$ or $TiCl_4$, the vanadium-containing compound is $VCl_3$ and the magnesium halide is $MgCl_2$.

7. The process of claim 5, wherein the halohydrocarbon promoter is selected from $CHCl_3$, $CCl_4$, $C_3HCl_7$, $CFCl_3$, $CClF_2CC_3$ and mixtures thereof.

8. The process of claim 5, wherein the first reactor and the second reactor are each fluidized bed reactors and contacting in each reactor takes place continuously in the gas phase.

9. A process for preparing polyethylene, comprising 1) contacting in a first reactor under polymerization conditions ethylene and optionally a comonomer in the presence of:
   a mixed metal catalyst comprising:
      a titanium complex that is the reaction product of a titanium-containing compound in which the titanium is in the +3 or +4 oxidation state, a magnesium halide and a first electron donor;
      a vanadium complex that is a vanadium-containing compound in which the vanadium is in the +2, +3, +4, or +5 oxidation state optionally reacted with a second electron donor; and
      optionally, a modifier compound having the formula $AlX_aR_{(3-a)}$, wherein X is a halide, each R is independently an alkyl having 1 to about 14 carbon atoms, and a is 0, 1, 2, or 3; and
   a first cocatalyst having the formula $AlR_3$, to form a mixture; 2) transferring the mixture to a second reactor connected in series to the first reactor; and 3) contacting the mixture with further ethylene, optionally further comonomer, and a second cocatalyst having the formula $AlR_3$ in the second reactor under polymerization conditions; wherein a halohydrocarbon promoter is present in one but not both of the reactors.

10. The process of claim 9, wherein the mixed metal catalyst comprises titanium complex and vanadium complex coimpregnated in a support material.

11. The process of claim 9, wherein the titanium-containing compound is $TiCl_3$ or $TiCl_4$, the vanadium-containing compound is $VCl_3$ and the magnesium halide is $MgCl_2$.

12. The process of claim 9, wherein the halohydrocarbon promoter is selected from $CHCl_3$, $CCl_{14}$, $C_3HCl_7$, $CFCl_3$, $CClF_2CCl_3$ and mixtures thereof.

13. The process of claim 9, wherein the first reactor and the second reactor are each fluidized bed reactors and contacting in each reactor takes place continuously in the gas phase.

14. Polyethylene made by the process of claim 1.

15. The polyethylene of claim 14 having a PDI of about 10 to about 30 and an MFR of about 100 to about 200.

16. Polyethylene made by the process of claim 5.

17. The polyethylene of claim 16 having a PDI of about 10 to about 30 and an MFR of about 100 to about 200.

18. Polyethylene made by the process of claim 10.

19. The polyethylene of claim 18 having a PDI of about 10 to about 30 and an MFR of about 100 to about 200.

* * * * *

UNITED STATES PATENT AND TRADEMARK OFFICE
CERTIFICATE OF CORRECTION

PATENT NO. : 5,442,018
DATED : August 15, 1995
INVENTOR(S) : Cann et al.

It is certified that error appears in the above-identified patent and that said Letters Patent is hereby corrected as shown below:

Column 14,
Claim 7, line 3, "$CClF_2CC_3$" should read --$CClF_2CCl_3$--.

Column 15,
Claim 12, line 2, "$CCl_{14}$" should read --$CCl_4$--.

Signed and Sealed this

Twenty-seventh Day of February, 1996

Attest:

BRUCE LEHMAN

*Attesting Officer*     *Commissioner of Patents and Trademarks*